United States Patent
Sharma et al.

(10) Patent No.: US 11,019,484 B2
(45) Date of Patent: May 25, 2021

(54) SYSTEMS AND METHODS FOR DISTRIBUTING INTERNET-OF-THINGS MESSAGES

(71) Applicant: T-Mobile USA, Inc., Bellevue, WA (US)

(72) Inventors: Nandita Sharma, Issaquah, WA (US); Cristian Asandului, Snoqualmie, WA (US); Phani Ramisetty, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 118 days.

(21) Appl. No.: 16/380,824

(22) Filed: Apr. 10, 2019

(65) Prior Publication Data

US 2020/0329368 A1 Oct. 15, 2020

(51) Int. Cl.
| | |
|---|---|
| *H04W 8/24* | (2009.01) |
| *H04W 4/12* | (2009.01) |
| *H04W 52/02* | (2009.01) |
| *H04W 4/70* | (2018.01) |
| *H04W 60/00* | (2009.01) |

(52) U.S. Cl.
CPC ............... *H04W 8/24* (2013.01); *H04W 4/12* (2013.01); *H04W 4/70* (2018.02); *H04W 52/0229* (2013.01); *H04W 60/00* (2013.01)

(58) Field of Classification Search
CPC ........... H04W 4/70; H04W 8/24; H04W 4/12; H04W 52/0225; H04W 52/0229; H04W 60/00; H04W 60/04
See application file for complete search history.

(56) References Cited

U.S. PATENT DOCUMENTS

| | | | |
|---|---|---|---|
| 10,291,477 B1* | 5/2019 | Askar | H04L 41/0809 |
| 2014/0254367 A1* | 9/2014 | Jeong | H04L 47/263 370/233 |
| 2015/0181564 A1* | 6/2015 | Rao | H04W 48/14 370/329 |
| 2017/0019750 A1* | 1/2017 | Palanisamy | H04W 4/70 |
| 2018/0063860 A1* | 3/2018 | Yeung | H04W 4/70 |

* cited by examiner

*Primary Examiner* — Paul H Masur
(74) *Attorney, Agent, or Firm* — Lee & Hayes, P.C.

(57) ABSTRACT

Systems and/or methods for distributing Internet-of-Things (IoT) can include a Service Capability Server (SCS) for facilitating an exchange of messages between an IoT device and an Application Server (AS). The SCS may store a priority value associated with the IoT device in a priority value database. The system may determine that a network condition has experienced a first change (e.g., an outage occurs), and may store incoming messages in a message database. Upon determining that the network has experienced a second change (e.g., the outage ends), the SCS may send the message to the IoT in a sequence of transmissions based, at least in part, on the priority value. In some instances, the priority value may be determined based on a registration process, the message, and/or one or more device parameter(s) of the IoT device.

20 Claims, 7 Drawing Sheets

SYSTEMS AND METHODS FOR DISTRIBUTING INTERNET-OF-THINGS MESSAGES

BACKGROUND

Internet-of-Things (IoT) devices are everyday physical devices that include electronics, software, sensors, and connectivity components to collect data and communicate the data over a network, e.g., a wireless network. IoT devices span many industries, such as consumer products, manufacturing, medical devices, and infrastructure equipment. Utility meters, flow sensors, location trackers, pace makers, and refrigerators are but a few examples of IoT devices.

Communication protocols have been developed to support the proliferation of new IoT devices. Lightweight M2M (LWM2M) defines an application layer protocol that supports IoT architectures on 3GPP networks. Other application protocols that support IoT architectures include the Message Queuing Telemetry Transport (MQTT) protocol, the Long Range (LoRa) protocol, and the SIGFOX protocol.

These application protocols enable IoT devices to access 3GPP network resources via service capability server (SCS) nodes and application server (AS) nodes, such that messages (e.g., SMS) can be sent between the IoT device and the AS node. However, sometimes a network connectivity issue occurs, causing the IoT architecture to store messages in a database, queued for sending to the IoT device once the connectivity issue is resolved. When the connectivity issue resolves, the SCS node 108 sends the messages to their intended recipients on a "first-in, first-out" basis. As such, typical IoT architectures do not distinguish between the different types and categories of IoT device (for instance, some IoT devices support Mission Critical (MC) systems, whereas other IoT devices provide consumers with entertainment or convenience). Rather, IoT architectures treat IoT devices indiscriminately when determining the order in which to send queued messages.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed to systems and methods for distributing Internet-of-Things (IoT) messages amid changing network conditions. The systems may provide a method for associating a priority value with an IoT device and determining a sequence of transmission of one or more messages based at least in part on the priority value.

In some examples, the system may comprise the IoT device in communication with an Application Server (AS) via a Service Capability Server (SCS) node. During a network outage (or other connectivity issue), the SCS node may receive a message (e.g., SMS) intended for the IoT device. The SCS node may determine that it is unable to send the message to the IoT device due to the network outage and, in response, store the message in a message database. Upon determining that the network outage has resolved, the SCS node may send the message to the IoT device as one of many transmissions in a sequence of transmissions, the position of the message in the sequence is based on a priority value associated with the IoT device.

In some embodiments, the system may determine that the priority value is associated with the IoT device by receiving the priority value from the IoT device during a registration procedure between the SCS node and the IoT device. The system may store the priority value in a priority value database with an association to a device identifier that identifies the IoT device from which the priority value is received. Upon determining to send the message, the system may determine that an intended recipient of the message corresponds to the device identifiers stored with the priority value. Accordingly, the system may determine that the intended recipient is the IoT device, and therefore, that the priority value is associated with the intended recipient.

In some embodiments, the system may determine that the priority value is associated with the IoT device via the message. The message may indicate that the priority value is associated with the intended recipient of the message. Therefore, upon determining that the intended recipient is the IoT device, the SCS node may determine that the priority value is associated with the IoT device.

In some examples, the system may determine that the priority value is associated with the IoT device based on receiving information indicating one or more device parameters of the IoT device. For instance, the SCS node may receive information indicating a device category and/or a device type of the IoT device (e.g., that the device category is medical devices and/or that the device type is a vitals monitor). The SCS node may determine that the one or more device parameters qualify the IoT device for the priority value based on a priority value scheme. The priority value scheme may, in some instances, be stored at the SCS node and may include a tier system for indicating which priority values correspond to which device parameters.

In some embodiments the IoT device may enter a power saving mode (PSM). The SCS node may determine that a load amount exceeds a predetermined threshold (e.g., that the network is experiencing a period of high congestion). In response, the SCS node may determine to store messages that are intended for low priority devices (e.g., devices associated with priority values from a lower tier and/or are not the highest priority value of the priority value scheme), while still sending messages that are intended for high priority devices (e.g., devices associated with a priority value that is the highest priority value of the priority value scheme or from the higher tiers). The SCS node may determine a device parameter of the IoT device—that the IoT device is in a Mission Critical (MC) device category. The SCS node may determine that the highest priority value is associated with the IoT device and may send a message to the high priority IoT device while the load amount exceeds the predetermined threshold. In some instances, the message may comprise an SMS message to "wake up" the IoT device, i.e., bring the IoT device out of the PSM.

Multiple and varied example implementations and embodiments are described throughout. Examples and portions of the systems, methods, and apparatuses discussed herein may be rearranged, combined, used together, duplicated, partially omitted, omitted entirely, and/or may be otherwise modified to arrive at variations on the disclosed implementations that combine one or more aspects of the systems, methods, and apparatuses.

Illustrative Systems for Distributing Internet-of-Things Messages

Figure 1:
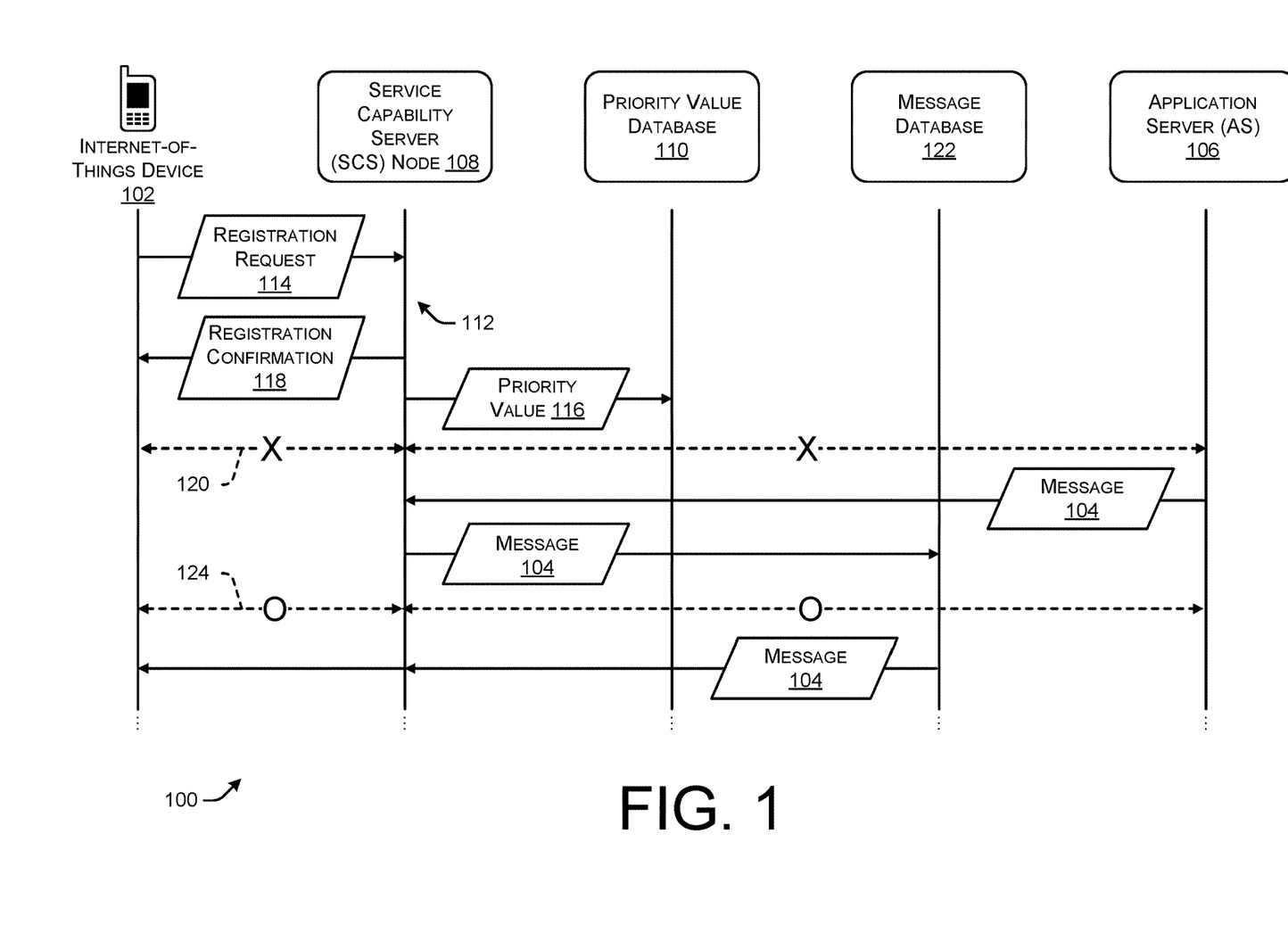
FIG. 1 depicts interactions of an example Internet-of-Things (IoT) architecture and a system for distributing IoT messages amid network condition status changes.

FIG. 1 depicts interactions of an example Internet-of-Things (IoT) architecture and a system 100 for distributing IoT messages amid network condition status changes. In some examples, the system 100 may include an IoT device 102 that exchanges one or more messages(s) 104 with an Application Server (AS) 106 via a Service Capability Server (SCS) node 108. The system may include a priority value database 110. During a registration procedure 112, the IoT device 102 may send a registration request 114 to the SCS node 108. The registration request 114 may include a priority value 116, which the system 100 may store in the priority value database 110 with an association with the IoT device 102.

In some instances, the SCS node 108 may accept the registration request 114 and send a registration confirmation 118 to the IoT device 102. In response to determining to register the IoT device 102, the SCS node 108 may store the priority value 116 in the priority value database 110. In some instances, the priority value 116 may be stored with an association with a device identifier corresponding to the IoT device 102. The association between the priority value 116 and the device identifier may indicate that the priority value 116 corresponds to the IoT device 102 (see FIG. 4).

Upon a network condition experiencing a first status change 120 creating a connectivity issue (e.g., a network outage occurring, a load amount on the network exceeding a predetermined threshold, and/or an initiation of a maintenance procedure), the SCS node 108 may store the message 104 it receives (e.g., from the AS 106, from the IoT device 102, from another IoT device, or from another network node) in a message database 122. For instance, the SCS node 108 may receive the message 104 from the AS 106 indicating the IoT device 102 as an intended recipient of the message 104 during a network outage, e.g., while a control plane component for providing a communication channel to the IoT device 102 is experiencing an error. The SCS node 108 may store and/or queue the message 104 in the message database 122 until the SCS node 108 is able to send the message 104 to the intended recipient IoT device 102.

Upon the network condition experiencing a second status change 124 that resolves the connectivity issue of the first status change 120 (e.g., the network outage ending, the load amount falling below the predetermined threshold, and/or the maintenance procedure terminating), the SCS node 108 may send the message 104 from the message database 122 to the IoT device 102. The message 104 may be sent as one of many messages in a sequence of transmissions such that a position of the message 104 in the sequence is determined by the priority value 116 associated with the IoT device 102.

In other words, if the priority value 116 associated with the IoT device 102 (i.e., the intended recipient of the message 104) is a highest priority value of a priority value scheme (400 of FIG. 4), the message 104 may be sent to the IoT device 102 before the SCS node 108 transmits other messages that are not intended to be sent to devices associated with the highest priority value. That is, the message 104 may have an earlier position in the sequence of transmissions relative to other messages corresponding to the highest priority value. Each of these components of the system is discussed in greater detail below (see FIGS. 4 and 5).

Figure 2:
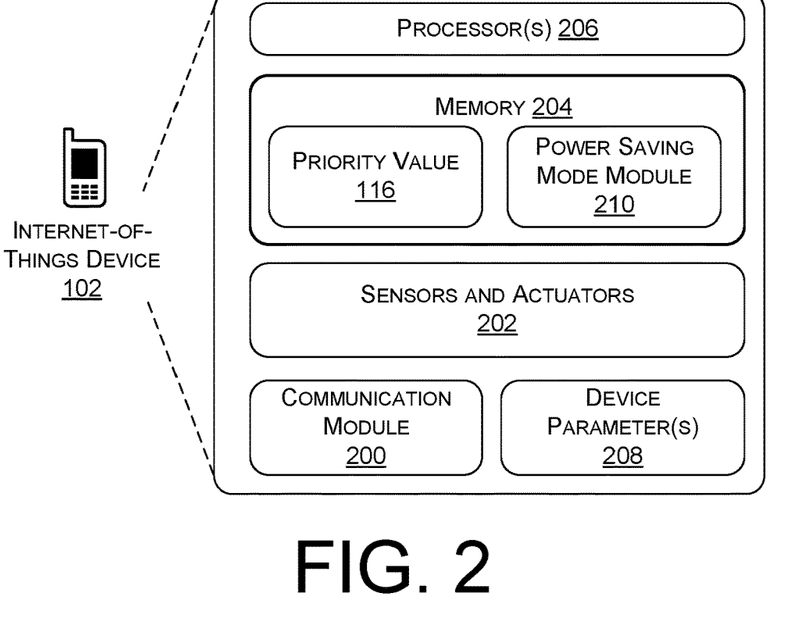
FIG. 2 depicts an example IoT device.

FIG. 2 depicts a schematic diagram of the IoT device 102. The IoT device 102 may comprise a physical device embedded with electronics and software (e.g., wireless communication module 200) for connecting the IoT device 102 to a network, such as an IoT network and/or a 3GPP network. Additionally, the IoT device 102 may include one or more sensors or actuators 202 to collect data from a surrounding environment of the IoT device 102. In some examples, the IoT device 102 may comprise a user device, e.g., a User Equipment (UE) such as a smart phone, smart watch, other wearable mobile device (e.g., smart glasses, epidermal device), laptop computer, desktop computer, and or mobile broadband adapter. The IoT device 102 may comprise a home network hub or any other computing device with wireless or wireline connectivity functionality.

The IoT device 102 may comprise one or more memory storage devices 204 ("the memory") which may be communicatively coupled to a processor 206, e.g., via a PCB board or mini-board. In some implementations, the processor 206 can include a microprocessor, a microcomputer, a microcontroller, a digital signal processor, a central processing unit (CPU), a graphics processing unit (GPU), etc. Among other capabilities, the processor 206 may operate to fetch and execute computer-readable instructions stored in the memory 204.

The memory 204 may comprise non-transitory computer-readable media including, but not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by an electronic device.

The IoT device 102 may include the communication module 200 comprising one or more hardware and/or software components to connect the IoT device 102 to the IoT architecture via the 3GPP network by communicating to a router via a short range wireless transmission protocol (Wi-Fi, Wi-Fi LP, Bluetooth, Bluetooth LE, Zigbee, Z-Wave, EnOcean) which, in turn, connects the IoT device 102 to the Internet via an Internet Service Provider (ISP) providing a TCP/IP pathway. Additionally or alternatively, the IoT device 102 may connect to the 3GPP network via a Radio Access Network (RAN). For instance, the IoT device 102 may include an embedded transceiver chip for sending an access request to a Base Station (BS) node which, in turn, connects the IoT device 102 to the IoT architecture via the 3GPP network.

The IoT device 102 may include the priority value 116 that is associated with the IoT device 102. The priority value 116 may comprise a numerical value of the priority value scheme 400 stored in the memory 204 for retrieval when the IoT device 102 generates the registration request 114 and/or the message 104. The priority value 116 may be stored in read-only memory, for instance, by a manufacturer during a manufacturing process, or the priority value 116 may be stored in read-write memory. The priority value 116 may be based on one or more device parameter(s) 208 that indicate a device category and/or a device type, as discussed in greater detail below regarding FIG. 4.

Figure 4:
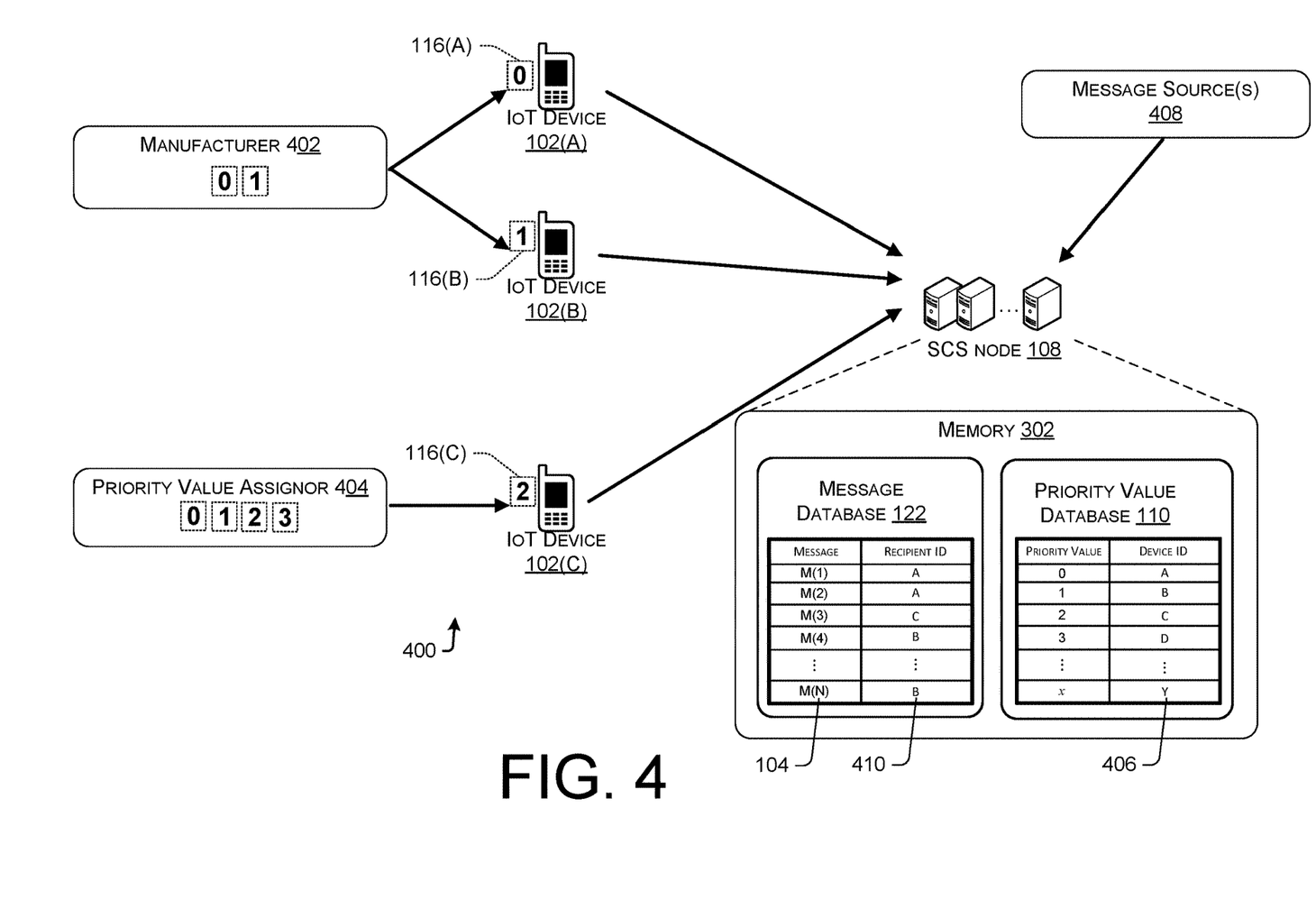
FIG. 4 depicts an example SCS node receiving priority values associated with IoT devices and receiving messages.

The priority value 116 may be assigned to the IoT device 102 via the priority value scheme 400 (see FIG. 4). By way of example, the priority value scheme 400 may comprise a first tier represented by a priority value of "0," a second tier represented by a priority value of "1," and a third tier represented by a priority value of "2." In such a priority value scheme 400 the IoT device 102 having an association with the priority value of "0" is in the first tier, and therefore has a highest priority value of the priority value scheme 400. Accordingly, when the SCS node 108 determines to send the message 104 identifying the IoT device 102 as the intended recipient (e.g., upon determining that a network connectivity issue has been resolved, see FIG. 5), the SCS node 108 recognizes that the message 104 is associated with the highest priority value of the priority value scheme 400 and sends the message 104 before other messages that are not associated with the highest priority value. The priority value scheme 400 is discussed in greater detail below regarding FIG. 4.

The IoT device 102 may comprise a Power Saving Mode (PSM) module 210 to control a power state of the IoT device 102. For instance, the PSM module 210 may cause the IoT device to enter a low-power state due to inactivity of the IoT device 102 and/or a predetermined PSM schedule. In some examples, the IoT device 102 may receive the message 104, which may comprise an SMS message, from the SCS node 108 or the AS 104. The PSM module 210 may cause the IoT device 102 to terminate the PSM status and enter an active status in response to receiving the message 102 (e.g., SMS message).

Figure 3:
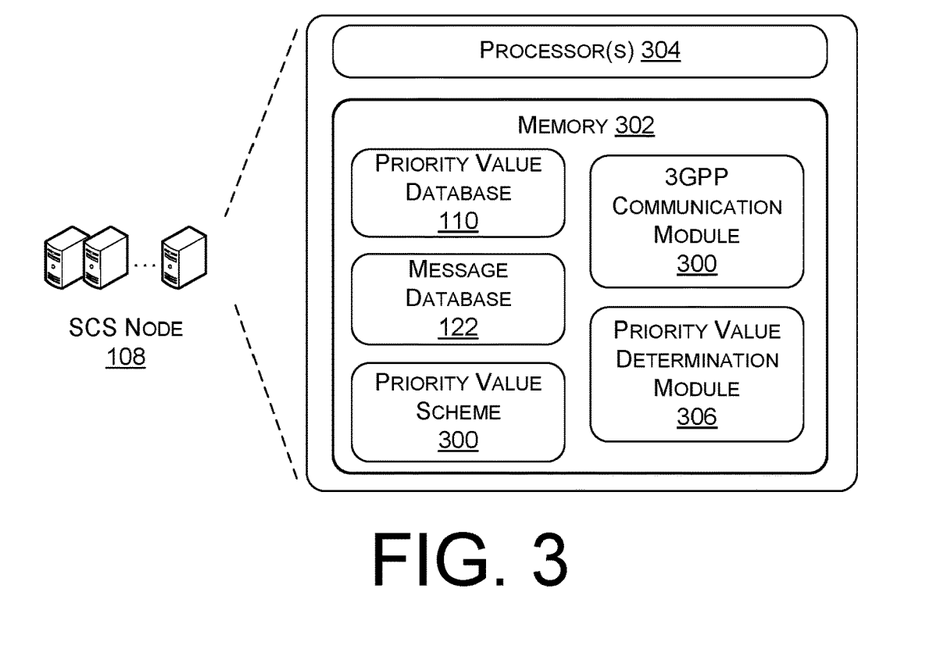
FIG. 3 depicts an example Service Capability Server (SCS) node.

FIG. 3 depicts a schematic diagram of the SCS node 108. The SCS node 108 may comprise a server device that routes upstream and downstream communications between the IoT device 102 and the AS 106 and/or between the AS 106 and other nodes of the 3GPP network (e.g., a Home Subscriber Server (HSS), a Call Session Control Function (CSCF), a Charging Data Function (CDF), and the like) via a 3GPP communication module 300. In some instances, the SCS node 108 may provide control plane functionality over the AS 106, such that the SCS node 108 communicates with the IoT device 102 via the AS 106. The SCS node 108 may provide additional service capabilities to the AS 106 and/or to the IoT device 102 by exposing various Open Service Access (OSA) application programming interfaces (APIs) to the AS 106 and/or the IoT device 102 via the 3GPP communication module 300. For instance, the SCS node 108 may enable the AS 106 to communicate through one or more 3GPP services by providing a gateway between the AS 106 and a 3GPP Wireless Service Provider (WSP).

The SCS node 108 may include one or more software modules stored in a memory 302 (which may be similar to memory 204) that, when executed by a processor 304 (which may be similar to processor 206), receives, detects, calculates, or otherwise determines the priority value 116 and an association of the priority value 116 with the IoT device 102. For instance, the SCS node 108 may include a priority value determination module 306 that extracts the priority value 116 from the registration request received at the SCS node 108, and/or from the message 104 received at the SCS node 108. The priority value determination module 306 may determine the priority value 116 from other information received at the SCS node 108, such as one or more device parameter(s) 208, corresponding to the IoT device 102, received at the SCS node 108.

The SCS node 108 may include one or more software modules that access the message database 122 for storing messages 104 received at the SCS node 108 from the IoT device 102, from the AS 106, and/or from other nodes of the 3GPP network. For instance, the SCS node 108 may receive the message 104 identifying the IoT device 102 as the intended recipient of the message 104. The SCS node 108 may attempt to establish a communication session with the IoT device 102 in order to transmit the message 104 to the IoT device 102. The attempt may result in a failed attempt and, in response to being unable to establish a communication session with the IoT device 102, the SCS node 108 may store the message 104 in the message database 122 as a queued message 104 for sending once communication with the IoT device 102 is established. Whether or not communication with the IoT device 102 can be established may depend on a network condition and one or more status changes to the network condition, discussed in greater detail below regarding FIG. 5. The message database 122 may be stored in the memory 300 of the SCS node 108 or the message database 122 may be stored in a memory storage device in a different location as the SCS node 108.

The AS 106 may comprise a server device that hosts and executes an IoT application corresponding to the IoT device 102. For instance, the AS 106 may host one or more software modules for receiving sensor data from the IoT device 102, analyzing the sensor data, and/or outputting results of the sensor data to a database, an upstream node of the IoT network, and/or back to the IoT device 102.

Functional components of the SCS node 108 and/or the AS 106 may reside at a single physical node or may be distributed across multiple physical nodes. Furthermore, one or more functional components of the SCS node 108 may be performed by the AS 106, and one or more functional components of the AS 106 may be performed by the SCS node 108. In some instances, the AS 106 may operate under the control of the SCS node 108.

FIG. 4 depicts an example of the system 100. The system 100 may comprise the SCS node 108 receiving priority values 116 associated with IoT devices 102 and receiving messages 104. The IoT device 102 may comprise a wide variety of devices across many industries. The priority value 116 may indicate which tier of a priority value scheme 400 the IoT device 102 belongs and/or whether data transmitted to and from the IoT device 102 is Mission Critical (MC) data. In some instances, the priority value 116 may be assigned to the IoT device 102 based on the device parameter 208 of the IoT device 102. The device parameter 208 may comprise an indication of a device category and/or a device type corresponding to the IoT device 102. For instance, the device parameter 208 may comprise an indication that the IoT device 102 comprises a device category of a medical device, a power plant system device, a municipal power distribution device, a transportation infrastructure device, a vehicle device, a home automation device, a manufacturing device, and/or an environmental monitoring device.

In some instances, the device parameter 208 may comprise an indication that the IoT device 102 comprises a particular device type within the device category. For instance, within the medical device category, the IoT device 102 may comprise a device type such as a vitals monitoring sensor (e.g., blood pressure monitor, heart rate monitor), a pace maker, a cochlear implant, a seizure monitor, a digital imaging device (e.g., MRI, X-ray CAT scan, video camera, etc.), and/or an emergency notification device. Within the power plant system device category, the IoT device 102 may comprise a device type such as a flow rate sensor, an energy consumption sensor, a voltage reader, or an equipment status sensor. Within the municipal power distribution device category, the IoT device 102 may comprise a device type such as a smart utility reader. Within the transportation infrastructure category, the device type may comprise a traffic signal device, toll readers, security cameras, traffic flow sensors, speed monitors, and smart vehicles. Within the vehicle device category, the IoT device 102 may comprise a car, a truck, a delivery truck (e.g., a semi-truck), an emergency response vehicle, a motorcycle, a boat, and an airplane. Within the home automation device category, the IoT device 102 may comprise a device type of a refrigerator, a lighting system, an HVAC system, a security system, a dishwasher, a laundry machine, a drying machine, a television, a stereo system, a smoke detector, and combinations, thereof. Within the manufacturing device category, the IoT device 102 may comprise the device type of an equipment status sensor, a temperature sensor, a flow rate sensor, a load sensor, a location sensor, a ballast sensor, a timer, and combinations thereof. Within the environmental device category, the IoT device 102 may comprise the device type of a temperature sensor, a moisture sensor, a pH sensor, a flow rate sensor, a GPS device, and combinations thereof.

As shown above, many device types discussed have a variety of applications in different industries such that they may correspond with multiple device categories. For instance, the device type of a GPS device, a video camera, and an equipment status sensor may correspond to any of the categories discussed above (e.g., medical device category, power plant system device category, a home automation device category, etc.). Furthermore, the device category may include one or more subcategories. For instance, the medical device category may be further divided into a hospital device medical category and an over-the-counter consumer medical device category.

The device parameter 208 may comprise a string of alphanumeric characters that indicate the device category and/or the device type. In some instances, the device parameter 208 may indicate other features of the IoT device 102, such as a location of the IoT device 102, an installation or activation date of the IoT device 102, and/or an operating status of the IoT device 102. As such, the device parameter 208 may comprise an immutable data value stored in the memory 204 of the IoT device 102, e.g., during a manufacturing process or registration process of the IoT device 102, a mutable data value indicating one or more conditions or statuses of the IoT device 102, or a combination thereof.

In some examples, the priority value scheme 400 may determine one or more priority value(s) 116 for one or more IoT device(s) 102 based on tiers that consider one or more device parameter(s) 208 associated with the one or more IoT device(s) 102. For instance, in determining which IoT device(s) 102 fit into which tiers, the priority value scheme 400 may consider combinations of the device categories and the device types discussed above. A first tier of the priority value scheme 400 corresponding to the highest priority value (e.g., "0") may be associated with Mission Critical (MC) systems, such as the hospital device category, the power generation system category, and/or one or more device types such the emergency response vehicle and/or the smoke detector. A second tier of the priority value scheme 400 corresponding to a second highest priority value (e.g., "1") and may be associated with secondarily critical systems, such as consumer medical devices and GPS devices. A third tier may correspond to a lowest priority value (e.g., "2") and may be associated with all other devices not qualifying for the higher tiers, e.g., the first tier or the second tier.

The priority value scheme 400 may comprise any number of tiers including at least two tiers based on the grouping of IoT devices 102 according to the device parameter(s) 208, i.e., device categories and device types. For instance, the priority value scheme 400 may comprise a first tier including devices having the device category of medical devices, and a second tier comprising IoT devices 102 that are not medical devices. In some examples, the tiers may distinguish between Mission Critical (MC) systems (a first tier corresponding to a highest priority value), and non-Mission Critical (non-MC) systems (a second tier corresponding to a lowest priority value).

The priority value scheme 400 may comprise any number of tiers corresponding to different priority values 116 according to the device parameter(s) 208 of the IoT devices 102 registered with the SCS node 108. For instance, the priority value scheme 400 may comprise two tiers, three tiers, four tiers, five tiers, even ten tiers, each corresponding to a different grouping of device categories and/or device types of the IoT devices 102 registered with the SCS node 108.

Turning to FIG. 4, by way of example, the system may comprise IoT device 102(A), IoT device 102(B), and IoT device 102(C). IoT device 102(A) and IoT device 102(B) may comprise medical devices manufactured by a manufacturer 402. Manufacturer 402 may assign a first priority 116(1) value to IoT device 102(A) and a second priority value 116(2) to IoT device 102(B). The first priority value 116(1) may comprise a highest priority value of the priority value scheme 400 (e.g., "0"), for example, because IoT device 102(A) may have the device parameter 208 of the device category of Mission Critical (MC), hospital medical device and/or a device type of a vitals monitoring device, whereas IoT device 102(B) may comprise a second highest priority value of the priority value scheme 400 (e.g., "1"), for example, because IoT device 102(B) may have the device parameter 208 of the device category of an over-the-counter medical device, and/or a device type of a blood pressure reader.

In some examples, IoT device 102(C) may receive a third priority value 116(3) after manufacturing, for instance, from a priority value assignor 404. The priority value assignor 404 may comprise a functional module of the SCS node 108 that determines the third priority value 116(3) of the IoT device 102(C) upon receiving a priority value request from the IoT device 102(C) for the third priority value 116(3). The priority value request may be included with the registration request 114 sent to the SCS node 108 and/or the message 104 received by the SCS node 108. The priority value assignor 404 may determine the third priority value 116(3) for the IoT device 102(C) and send the third priority value 116(3) to the IoT device 102(C) for storage at the IoT device 102(C) and/or the priority value assignor 404 may store the third priority value 116(3) in the priority value database 110 with an association to a device identifier 406 indicating that the third priority value 116(3) corresponds to the IoT device 102(C). In some embodiments, the priority value assignor 404 may determine the third priority value 116(3) based on determining one or more device parameter(s) 208 of the IoT device 102(C) and comparing the one or more device parameter(s) 208 to the groups defined by one or more tiers of the priority value scheme 400. For instance, the registration request 114 and/or the message 104 sent from the IoT device 102(C) may include data indicating a manufacturer, a model number, a unique identifier, combinations thereof, and/or other information related to the IoT device 102(C) that indicates a device category and/or a device type corresponding to the IoT device 102(C).

In some embodiments, the SCS node 108 may store the priority value 116 associated with the IoT device 102 in the priority value database 110. The priority value database 110 may comprise one or more of a comma delimited list, a spreadsheet, a NoSQL data structure, or any other data type, data structure, and/or data system for storing retrievable data. The priority value 116 may be stored with an association to the device identifier 406 that corresponds to the IoT device 102. For instance, as shown in FIG. 4, the priority value "0" may be stored with an association to the device identifier "A" by storing the priority value "0" in same row of a spreadsheet as the device identifier "A."

In some examples, the SCS node 108 may receive one or more message(s) 104 from one or more message source(s) 408. As discussed above, the one or more message source(s) 408 may comprise the AS 106, one or more other IoT device(s) 102 (e.g., in a M2M network), and/or other nodes of the 3GPP network that interact with the IoT device 102. The SCS node 108 may store the one or more message(s) 104 in the message database 122. The message database 122 may comprise one or more of a comma delimited list, a spreadsheet, a NoSQL data structure, or any other data type, data structure, and/or data system for storing retrievable data. The one or more message(s) 104 may be stored in the message database 122 with an association to one or more intended recipient identifier 410 of the one or more message(s) 104. For instance, as shown in FIG. 4, message "M(1)" may be stored in the message database 122 with an association to the intended recipient identifier "A" by storing the message "M(1)" in a same row of a spreadsheet as the intended recipient identifier "A." In some instances, the SCS node 108 may determine that the message 104 (e.g., message "M(1)") stored in the message database 122 is associated with the priority value 116 (e.g., priority value "0") based on determining that the intended recipient identifier 410 (e.g., message recipient identifier "A") corresponds with the device identifier 406 (e.g., device identifier "A"). Accordingly, the SCS node 108 may send the message 104 to the intended recipient in a sequence of transmissions based on the priority value 116.

Figure 5:
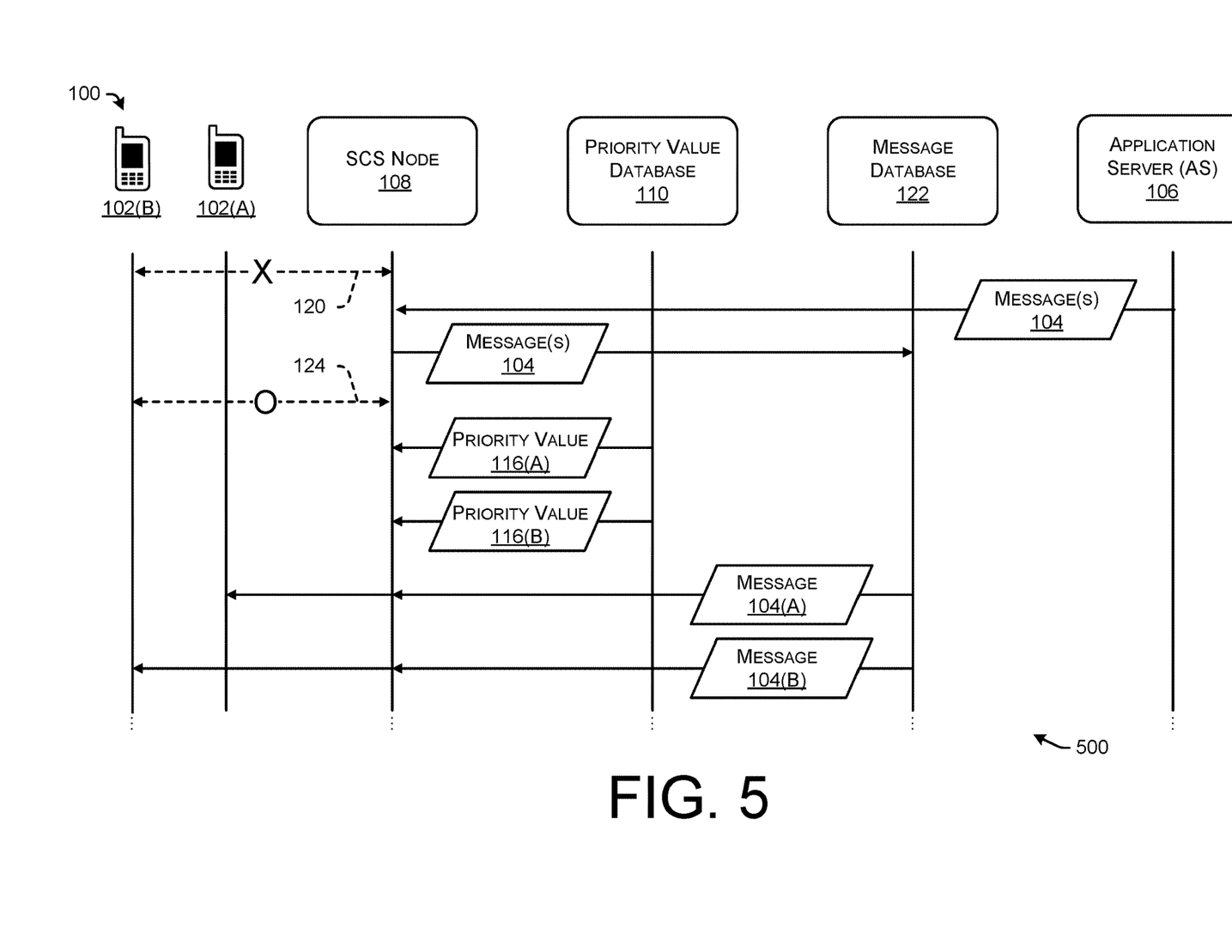
FIG. 5 depicts interactions of an example IoT architecture and the SCS determining a sequence of transmissions based on one or more priority values.

FIG. 5 depicts example interactions of the SCS node 108 determining a sequence of transmissions 500 based on one or more priority value(s) 116 in an example IoT architecture. The system 100 may comprise a network condition experiencing the first status change 120, such as a power outage, a load amount exceeding a predetermined threshold, and/or an initiation of the maintenance procedure. The first status change 120 may result in a connectivity issue and cause the SCS node 108 to determine that it is unable to establish a communication session with one or more IoT device(s) 102 The SCS node 108 may receive a first message 104(A) indicating that a first IoT device 102(A) is the intended recipient while the SCS node 108 is unable to establish the communication session with the IoT device 102(A). In some examples the SCS node 108 may receive a second message 104(B) indicating that the second IoT device 102(B) is the intended recipient. In response to receiving first message 104(A) and/or second message 104(B) and determining that it is unable to send first message 104(A) and/or second message 104(B0), the SCS node 108 may store first message 104(A) and/or second message 104(B) in the message database 122.

The network condition may experience the second status change 124 which resolves the connectivity issue, such as the power outage ending and returning to an operational status, the load amount falling below the predetermined load amount threshold, and/or the maintenance procedure ending. Upon detecting the second status change 124, the SCS node 108 may access one or more priority value(s) 116 stored in the priority value database 110. The SCS node 108 may determine that one or more priority value(s) 116 stored in the priority value database 110 are associated with one or more devices that match one or more intended recipients of messages 104 received during the outage, e.g., the intended recipients of first message 104(A) and/or second message 104(B).

For example, the SCS node 108 may determine that a first priority value 116(A) is a highest priority value of the priority value scheme 400, that first priority value 116(A) is associated with the first IoT device 102(A), and that first message 104(A) is intended for the first IoT device 102(A). Additionally, the SCS node 108 may determine that second priority value 116(B) is a second highest priority value, or a priority value below the highest priority value, of the priority value scheme 400, and that second priority value 116(B) is associated with the second IoT device 102(B). The SCS node 108 may determine that second message 104(B) is intended for the second IoT device 102(B). Based on these determinations, the SCS node 108 may determine a sequence of transmissions 500 for sending first message 104(A) to the first IoT device 102(A) and for sending second message 104(B) to the second IoT device 102(B). For example, the SCS node 108 may send first message 104(A) in a first position in the sequence of transmissions 500 and second message 104(B) in second position in the sequence of transmissions 500. Because the intended recipient of first message 104(A), the first IoT device 102(A), is associated with priority value 116(A) that is the highest priority value and/or is a higher priority value than the priority value 116(B) associated with the intended recipient of second message 104(B), the second IoT device 102(B), the first position in the sequence of transmissions 500 may be earlier/prior to the second position. That is, the SCS node 108 may send the first message 104(A) to the first IoT device 102(A) before sending the second message 104(B) to the second IoT device 102(B), based on first priority value 116(A) associated with the first IoT device 102(A), and the second priority value 116(B) associated with the second IoT device 102(B).

Figure 6:
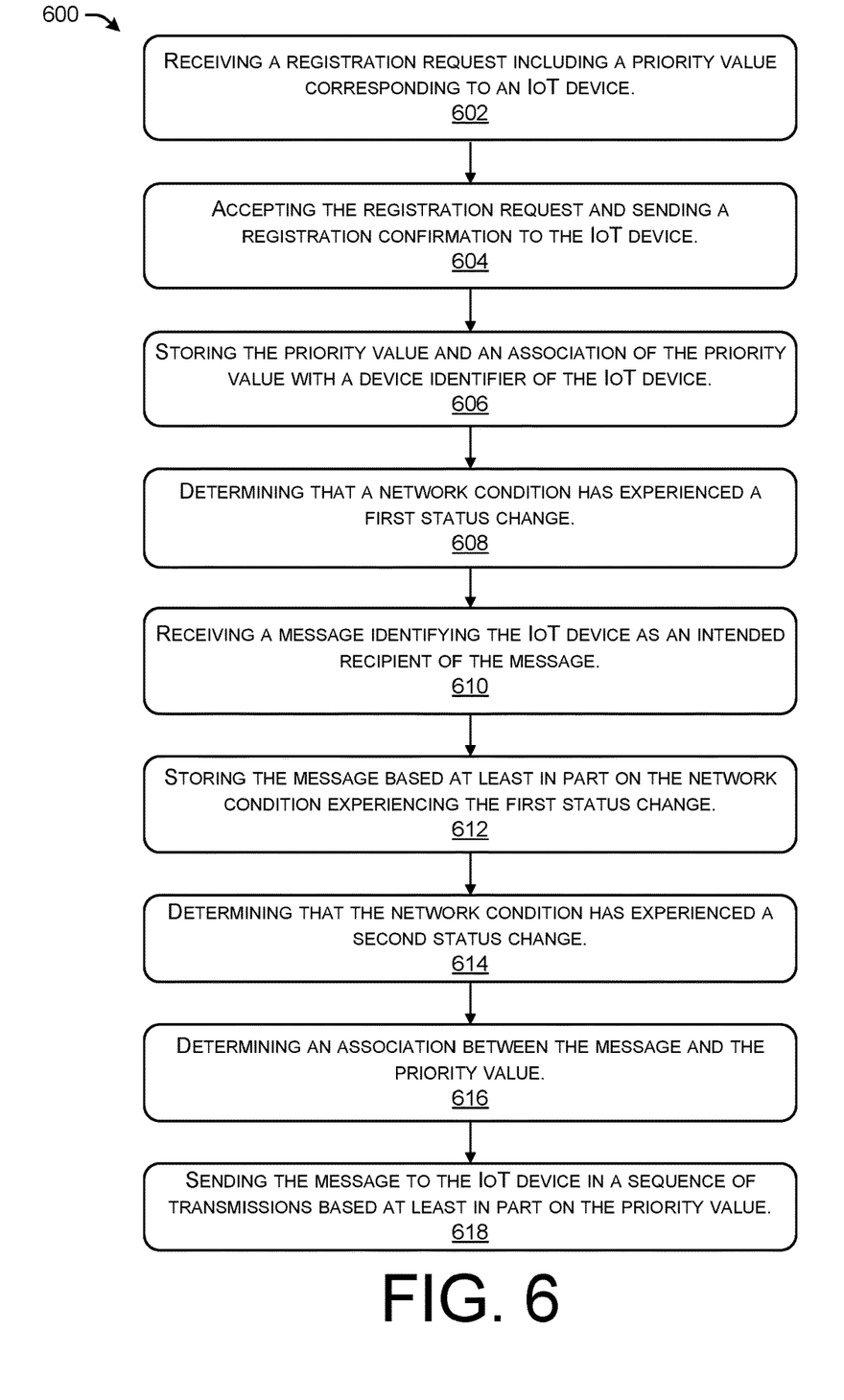
FIG. 6 depicts a process for distributing IoT messages based on a priority value received during a registration procedure.

FIG. 6 depicts an embodiment of a process 600 that may be performed by the system 100 including steps for distributing one or more message(s) 104 based on one or more priority value(s) 116 received during the registration procedure 112. At step 602 the SCS node 108 may receive the registration request 114 from the IoT device 102 that includes the priority value 116 associated with the IoT device 102. For instance, the IoT device 102 may send the registration request 114 to the SCS node 108 via a router connecting the IoT device 102 to the Internet Service Provider (ISP), and/or the IoT device 102 may send the registration request via the Radio Access Network (RAN).

At step 604, the SCS node 108 may accept the registration request 114 and send a registration confirmation 118 indicating acceptance of the registration request 114 to the IoT device 102. The registration confirmation 118 may include an indication that the SCS node 108 received the priority value 116, that the SCS node 108 stored the priority value 116, and/or that the SCS node 108 will rely on the priority value 116 for sending messages 104 to the IoT device 102.

At step 606, the SCS node 108 stores the priority value 116 and an association of the priority value 116 with the device identifier 406, the device identifier 406 corresponding to the IoT device 102. The priority value 116, the association, and the device identifier 406 may be stored at the priority value database 110. The priority value database 110 may be stored in the memory 302 at a same physical node as the SCS node 108 or the priority value database 110 may be stored at a separate physical node from the SCS node 108.

At step 608, the SCS node 108 determines that a network condition has experienced the first status change 120. For instance, the SCS node 108 may receive a message failure or timeout notification in response to sending the IoT device 102 a request to initiate a communication session. The SCS node 108 may receive a notification from another 3GPP node (e.g., a Network Element Manager (NEM) or a Performance Manager (PM)) indicating that a network outage has occurred, indicating that a load amount on the network exceeds a predetermined threshold, and/or indicating that a maintenance procedure, which may affect an ability of the IoT device 102 to communicate with other nodes of the network, has initiated.

At step 610 the SCS node 108 receives the message 104 identifying the IoT device 102 as the intended recipient. For instance, the message 104 may include a header for routing the message 104 through the various protocol layers, and the header may include a particular intended recipient identifier 410 indicating a terminal device of the message 104.

At step 612 the SCS node 108 stores the message 104 in the message database 122. The SCS node 108 may determine to store the message 104 based on determining that the network condition experienced the first status change 120, and that the SCS node 108 is unable to establish a communication session with the IoT device 102. The message 104 may be stored with the association to the intended recipient identifier 410.

At step 614, the SCS node 108 determines that the network condition has experienced the second status change 124. For instance, the SCS node 108 may receive a message from a network node indicating that the outage is over (i.e., changed to a not-outage status), indicating that the load amount on the network has fallen below the predetermined threshold, and/or that the maintenance procedure has terminated. In some instances, the SCS node 108 may determine that the second status change 124 has occurred by successfully establishing a communication session with the IoT device 102.

At step 616 the SCS node 108 determines the association between the message 104 and the priority value 116. For instance, the SCS node 108 may determine that the device identifier 406 associated with the priority value 116 corresponds to the intended recipient identifier 410 associated with the message 104. Accordingly, the SCS node 108 may determine that the message 104 is intended to be sent to the IoT device 102 associated with the priority value 116.

At step 618, the SCS node 108 sends the message 104 to the IoT device 102 in the sequence of transmissions 500 based on the priority value 116. The priority value 116 may indicate the position in the sequence of transmissions 500 in which the message 104 is sent. For instance, the priority value 116 may comprise a highest priority value of the priority value scheme 400, indicating that the message 104 is sent in a first or earlier position in the sequence of transmissions 500. The priority value 116 may comprise a lowest or bottom priority value of the priority value scheme 400, indicating that the message 104 is sent in a second or later position in the sequence of transmissions 500 relative to messages 104 associated with a higher priority value.

Figure 7:
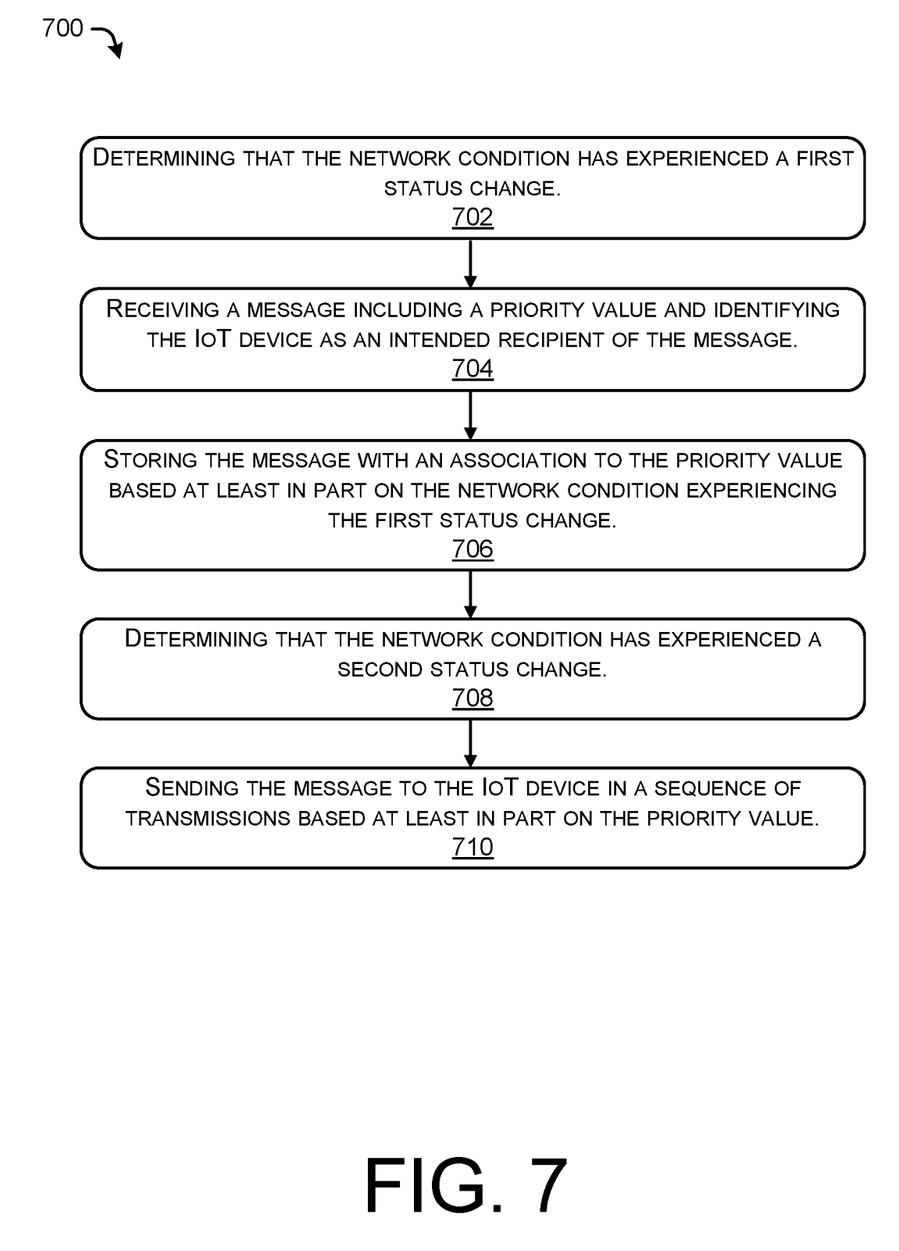
FIG. 7 depicts a process for distributing IoT messages based on a priority value received with a message.

FIG. 7 depicts an example process 700 that may be performed by the system 100 including steps for distributing one or more message(s) 104 based on one or more priority value(s) 116 received with the message 104. At step 702, the system 100 may determine, for instance at the SCS node 108, that the network condition has experienced the first status change 120. The SCS node 108 may receive a message failure or timeout notification in response to sending the IoT device 102 a request to initiate a communication session, and/or a notification from another 3GPP node (e.g., a Network Element Manager (NEM) or a Performance Manager (PM)) indicating that a network outage has occurred, indicating that a load amount is greater than a predetermined load amount, and/or indicating that a maintenance process has initiated.

At step 704, which in some instances may occur during a time period after step 702, the system 100 may receive the message 104, for instance at the SCS node 108, and the message 104 may identify the IoT device 102 as an intended recipient of the message 104 via the intended recipient identifier 410. The message 104 may also include the priority value 116 associated with the message 104 and/or associated with the IoT device 102. For instance, the message 104 may indicate that it is an MC message and/or that the IoT device 102 is an MC device. The message 104 may indicate that the intended recipient of the message 104 satisfies one or more requirements of a priority value scheme tier, for instance, based on one or more device parameter(s) 208 of the intended recipient.

At step 706, the system 100, for instance at the SCS node 108, may store the message 104 (e.g., in the message database 122) with the association to the priority value 116 based at least in part on the network condition experiencing the first change 120. For instance, the SCS node 108 may store the message 104 as a result of the SCS node 108 determining that it is unable to send the message 104 to the IoT device 102 at the time the message 104 is received at the SCS node 108.

At step 708 the system 100, for instance at the SCS node 108, may determine that the network condition has experienced the second status change 124. For instance, the system 100 may determine that a network outage has ended, that the load amount has fallen below the predetermined threshold, and/or that the maintenance procedure has ended. As a result of the network condition experiencing the second change 124, the SCS node 108 may determine that it is capable of establishing a communication session with the IoT device 102.

At step 710, the system 100, for instance at the SCS node 108, may send the message 104 to the IoT device 102 as one of many transmissions from the SCS node 108. For instance, the message 104 may have a position in the sequence of transmissions 500 based on the priority value 116 associated with the message 104. The priority value 116 may comprise the highest priority value of the priority value scheme 400, in which case the message 104 may be sent before other messages associated with other priority values 116 that are not the highest priority value.

Figure 8:
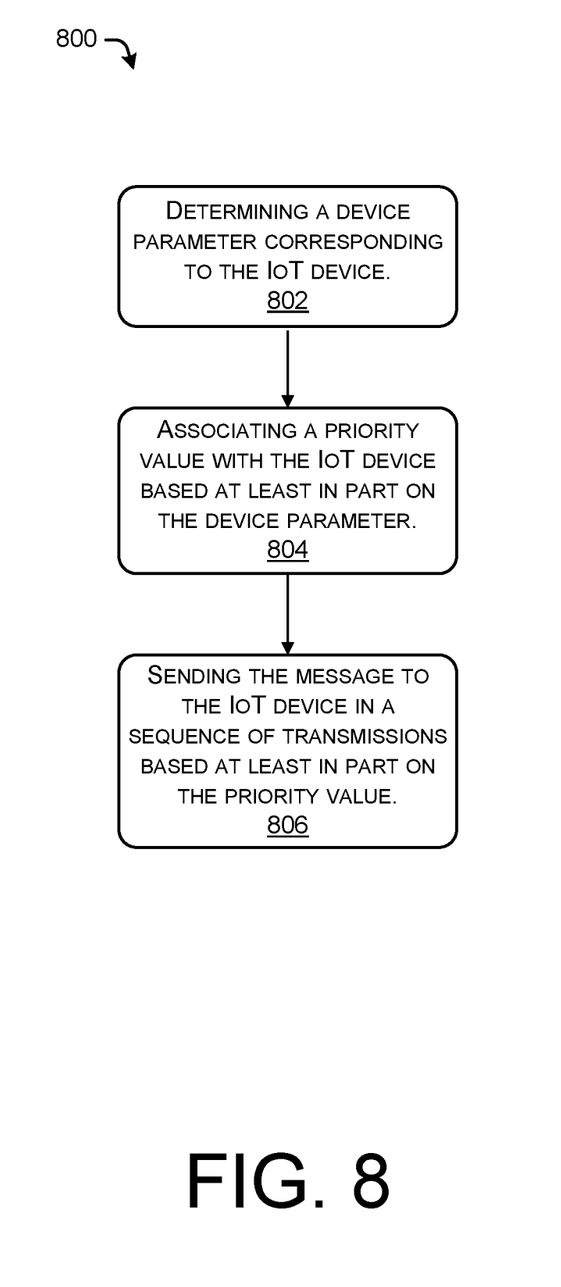
FIG. 8 depicts a process for distributing IoT messages based on a priority value determined based on one or more device parameters.

FIG. 8 depicts an example process 800 that may be performed by the system 100 including steps for distributing one or more message(s) 104 based on one or more priority value(s) 116 determined based on one or more device parameter(s) 208. At Step 802, the system 100 may determine the device parameter 208 corresponding to the IoT device 102. For instance, the SCS node 108 may receive information related to the IoT device 102 (e.g., from the IoT device 102 during the registration procedure 112, from the AS 106, or from another node of the network, such as the HSS). The information may include one or more device parameter(s) 208 of the IoT device 102, such as the device category of the IoT device 102 and/or the device type of the IoT device 102. For example, the SCS node 108 may determine the manufacturer 402 and/or a model number of the IoT device 102 and match the manufacturer 402 and/or a model number to one or more device categories and/or device types.

At step 804, the system 100 may associate the priority value 116 with the IoT device 102 based on the one or more device parameter(s) 208. The SCS node 108 may determine that one or more device parameter(s) 208 correspond to one or more tiers of the priority value scheme 400. By way of example, the SCS node 108 may determine that the device category comprises "medical devices," "emergency medical devices," "vitals monitoring devices," and determine that these device categories correspond to the first tier of the priority value scheme 400 and, accordingly, associate the highest priority value with the IoT device 102. The SCS node 108 may determine that the device category comprises "power generation system devices," "power distribution devices," "critical infrastructure monitoring devices," or "mission critical devices," and determine that these device categories correspond to the first tier of the priority value scheme 400 and, accordingly, associate the highest priority value with the IoT device 102.

At step 806, the system 100 may send the message 104 to the IoT device 102 in the sequence of transmissions 500. The position of the message 104 in the sequence of transmissions 500 may be based on the priority value 116 as discussed above.

While FIGS. 6-8 illustrate example series of steps, the described steps in these FIGS. (and all other methods and operations disclosed herein) may be performed in other orders different than those illustrated in FIGS. 6-8 and/or multiple steps may be performed simultaneously or in parallel. Furthermore, in some embodiments, one or more steps illustrated in FIGS. 6-8 may be omitted, repeated, and/or combined with other steps illustrated in FIGS. 6-8, or any other steps discussed in this disclosure. In some instances, the steps illustrated in FIG. 6-8 may be performed in multiple iterations for instance, to register a plurality of IoT devices 102 with the SCS node 108 and/or to send a plurality of messages 104 to the plurality of IoT devices 102 in a sequence determined by their respective priority values 116.

CONCLUSION

Although this disclosure uses language specific to structural features and/or methodological acts, it is to be understood that the scope of the disclosure is not necessarily limited to the specific features or acts described. Rather, the specific features and acts are disclosed as illustrative forms of implementation.

What is claimed is:

1. An internet-of-things (IoT) device comprising:
   a processor; and
   computer-readable instructions that, when executed by the processor:
   generate a registration request including a priority value associated with the IoT device, the priority value comprising a numerical value indicating a type of device that the IoT device comprises;
   send, via a first wireless transmission, the registration request to a server device that stores messages and priority values;
   receive, via a second wireless transmission, an indication that the registration request is accepted by the server;
   receive, via a third wireless transmission, a message from the server device which, based at least in part on a determination that a network condition has changed from an outage status to an operational status, sends the message.

2. The IoT device of claim 1, wherein the priority value affects a transmission order of the message used when the network condition of the server has changed to the operational status.

3. The IoT device of claim 1, further comprising a time period between the second transmission and the third transmission, wherein, during the time period, the server determines that the network condition has the outage status, and stores the message in a message database based at least in part on the determination that the network condition has the outage status.

4. The IoT device of claim 1, wherein the priority value is based on a device parameter that indicates whether the type of device comprises:
   a medical device;
   a power distribution device;
   a traffic signaling device;
   a location tracking device;
   an emergency response device; or
   a consumer device.

5. The IoT device of claim 1, further comprising a priority value scheme that includes a distribution of one or more numerical value assignments to one or more devices based on one or more device parameters of the one or more devices.

6. The IoT device of claim 5, wherein the server device determines the distribution and stores the priority value scheme in a priority database.

7. The IoT device of claim 1, wherein the priority value is stored in a read-only memory of the IoT device.

8. The IoT device of claim 1, wherein the priority value corresponds to an immutable device parameter of the IoT device.

9. A server device comprising:
   a processor, a non-transitory memory, and computer-readable instructions stored in the non-transitory memory that, when executed by the processor:
   receive in one or more transmissions, from a user device, a registration request, a priority value comprising a numerical value indicating a type of device that the user device comprises, and a device identifier of the user device;
   receive a message that indicates the user device as an intended recipient of the message;
   while a network condition indicates an outage status, store the message;
   determine that the network condition has changed to an operational status;
   send, based at least in part on the network condition experiencing the status change, the message to the user device within a sequence as determined by the priority value.

10. The server device of claim 9, wherein the priority value is received in a data packet that includes the priority value and the registration request.

11. The server device of claim 10, wherein the instructions store the priority value with the association to the device identifier in response to accepting the registration request.

12. The server device of claim 9, further comprising determining to send the message to the user device based at least in part on determining that the device identifier corresponds to a recipient identifier associated with the message.

13. The server device of claim 9, wherein the processor further determines that the priority value is a highest priority value of a priority value scheme, and further comprising:
   sending the message in a first position within a sequence of data transmissions based, at least in part, on determining that the priority value is the highest priority value;
   determining that a second priority value associated with a second message is not the highest priority value of the priority value scheme; and
   sending the second message in a second position within the sequence of data transmissions based, at least in part, on determining that the second priority value is not the highest priority value, the second position being later in the sequence than the first position.

14. The server device of claim 9, wherein the message comprises a wake-up message for causing the device to exit a power saving mode.

15. A method comprising:
   determining that a network condition has experienced a first change;
   receiving a plurality of messages from a plurality of devices;
   storing, based at least in part on determining that the network condition has experienced the first change, the plurality of messages in a message database;
   determining that the network condition has experienced a second change; and
   sending, based at least in part on determining that the network condition has experienced the second change, one or more messages of the plurality of messages in a sequence of transmission based at least in part on one or more priority values associated with the one or more messages, the one or more priority values comprising one or more numerical values indicating different types of devices.

16. The method of claim 15, further comprising determining that the one or more messages are associated with the one or more priority values based at least in part on determining that one or more intended recipient identifiers associated with the one or more messages correspond to one more device identifiers associated with the one or more priority values that are stored in a priority value database.

17. The method of claim 15, further comprising determining that the one or more messages corresponds to the one or more priority values based at least in part on the one or more priority values being received in one or more data packets that include the one or more messages.

18. The method of claim 15, wherein the first change comprises a change to an outage status, and the second change comprises a change to an operational status.

19. The method of claim 15, wherein the first change comprises a change of a network load amount to above a network load threshold, and the second change comprises a change of the network load amount to below the network load threshold.

20. The method of claim 15, wherein the first change comprises an initiation of a network maintenance process, and the second change comprises a termination of the network maintenance process.

* * * * *